United States Patent Office 3,180,838
Patented Apr. 27, 1965

3,180,838
TRIALKYL ALUMINUM ACETYLACETONATE
CATALYSTS FOR ACRYLONITRILE POLYMERIZATION
Robert Chiang, Durham, N.C., assignor, by mesne assignments, to Monsanto Company, a corporation of Delaware
No Drawing. Filed Sept. 1, 1961, Ser. No. 135,459
4 Claims. (Cl. 252—431)

This invention relates to novel ionic-type catalyst compositions, methods for preparing the same and to polymerization processes in which they are utilized.

In recent years the most significant development in the field of polymerization catalysis has been the utilization of complex compounds in heterogeneous polymerization systems. Perhaps, the best known among these catalyst systems which embody the principle of surface active initiation to synthesize polymer structures are those disclosed by Ziegler in U.S. Patent 2,781,410 wherein aluminum trialkyls complexed with metal halides are employed. In contrast to the earlier free radical or redox type systems, these complex organometallic catalysts have been shown to have the great advantage of a directing influence on the addition of monomer units to the polymer chain. This, of course, provides the possibility of increasing such important polymer properties as density, crystallinity and melting point.

The use of ionic type catalysts was until recently limited to the polymerization of hydrocarbon monomers. The difficulty with non-hydrocarbon or polar monomers containing functional groups has been that the monomer tended to inactivate the catalyst by reacting with it. Certain agents have now been reported which apparently overcome this problem and are capable of initiating polymerization of polar monomers, such as acrylonitrile. Among these materials are various alkoxides, quaternary ammonium hydroxides, Grignard reagents, metal alkyls or aryls and Alfin catalysts. However, it has been a common experience that the problems arising out of the use of these materials outweigh the advantages they provide. Examples of some of the problems which have been encountered are an uncontrollable reactivity which may be explosive at room temperatures, an inability to obtain a polymer with a molecular weight sufficiently high for fiber-forming purposes, and the incorporation of initiator fragments in the polymer.

Natta has now reported in German Patent 1,068,895 that acrylonitrile can be satisfactorily polymerized to fiber-forming polymers by employing an organometallic initiator consisting of an aluminum or zinc alkyl and an alcoholate or acetylacetonate of chromium or vanadium. Although this development appears to have overcome some of the aforementioned problems, the catalyst is not wholly satisfactory in that the polymers produced are found to be highly discolored.

Polymer discoloration is a serious drawback, particularly when the end-use contemplated is for the fabrication of textile fibers and yarns. The reason for this is that it is often desired to dye textile articles to various light or pastel shades, and with discolored yarn it is virtually impossible to attain the desired shade. Furthermore, a white color is often sought for textile fabrics, and, of course, this cannot be accomplished with discolored yarns.

The avoidance of polymer discoloration when polymerizing acrylonitrile in the presence of organometallic catalysts is extremely difficult to attain. Presumably this color formation problem arises from the conjugated system

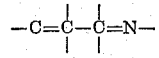

which is inevitably formed by side reactions in alkaline medium.

Therefore, it is an object of this invention to provide novel ionic-type catalyst systems which are capable of initiating the polymerization of acrylonitrile in a satisfactory manner to produce a polymer which is substantially free of discoloration.

It is another object of this invention to provide methods for preparing the novel catalysts of this invention.

It is a further object of this invention to provide a process for the polymerization of acrylonitrile utilizing the novel catalysts of this invention.

Other objects of this invention will become apparent as the following discussion of the invention proceeds.

It has now been found that an organometallic catalyst obtained by reacting aluminum trialkyls with acetylacetone can be effectively employed to initiate the polymerization of an acrylonitrile monomer to produce linear high polymers of fiber-forming characteristics, which polymers are substantially free of discoloration. The molar ratio of aluminum trialkyl to acetylacetone may vary between 1:1, 1:2 and 1:3, respectively. However, the preferred catalysts of this type are prepared by employing the aluminum trialkyl and acetylacetone components in molar ratios of from 1:2 to 1:3. The reason for this preference will be elucidated hereafter.

The aluminum trialkyl component of the catalyst are well known and commercially available compounds embraced by the empirical formula:

wherein $R_1$, $R_2$ and $R_3$ represent the same or different alkyl groups containing from 2 to 12 carbon atoms. Aluminum triethyl is probably the most readily available of these compounds, and for that reason will be noted when reference is made to a specific compound of this type, although it is to be understood that the general class as described above is fully applicable.

In general, the catalysts are prepared in an oxygen free atmosphere and under anhydrous conditions by simply adding each of the two components in the proper proportions to an inert, paraffin hydrocarbon solvent, such as n-heptane. Because of the high reactivity of these materials the addition should be made cautiously, and the temperature of the reaction medium should be controlled and kept near 0° C.

The reaction product obtained when the aluminum trialkyl and acetylacetone are present in molar ratios of 1:1 is fully soluble in the hydrocarbon solvent employed as the reaction medium. In contrast, when the catalyst is prepared by employing the aluminum trialkyl and acetylacetone components in molar ratios of from 1:2 to 1:3, the resulting reaction product is only partially or very sparingly soluble in the n-heptane or other paraffin hydrocarbon used as the reaction medium for conducting the reaction. Hence, it is readily apparent that the product obtained by employing the aluminum trialkyl and acetylacetone in molar ratios of from 1:2 to 1:3 is susceptible to being washed following formation by the hydrocarbon employed as a reaction medium.

Surprisingly, it has been found that when the catalyst product is subjected to a washing treatment—i.e., successive washings of 3 or 4 times with n-heptane or other hydrocarbon reaction medium employed—the polymer obtained when this washed catalyst is employed to initiate acrylonitrile polymerization is white and possesses a good molding property. This not to imply that the polyacrylonitrile formed by employing the catalyst comprising aluminum trialkyl and acetylacetone in molar ratios of 1:1 is not relatively free of discoloration; but only that the washed catalyst is particularly outstanding in this respect.

It should be emphased that the catalyst of this invention are employed as they are prepared in situ. There are no pure compounds isolated from the reaction mass, since it is not clearly understood as to which elements of the total reaction product confers the catalytic activity. This is made more apparent by the fact that the pure compound aluminum acetylacetonate is not catalytically active.

The acrylonitrile polymerization procedures embodying this invention are carried out in liquid phase. The nature of the liquid vehicle employed is subject to wide variation, i.e., the usual solvents commonly employed in conducting these polymerizations may be employed, with dimethyl formamide and dimethyl acetamide being of preference. The amount of vehicle or solvent can vary widely in relation to the monomer-catalyst mixture, it being only necessary that sufficient monomer be in solution at any given time to effect reaction thereof. It has been found particularly advantageous to use a high monomer to solvent ratio, say, for example, a volume ratio of around 1:3. In such instances the polymer precipitates out of solution as it is formed because of its insolubility in the monomer. This, of course, permits the carrying out of the reaction to a high conversion and the polymer can be recovered by simple filtration.

The polymerization should be carried out under anhydrous conditions and in an inert atmosphere which can be accomplished, for example, by blanketing the reaction zone with gaseous nitrogen. The polymerization may be conducted with temperatures in the range of from 0° to 100° C., and particularly good results are obtainable in the range of from 25° to 75° C. The capability for operating at these lower preferred temperatures contributes substantially to avoidance of discoloration in the polymer produced. Polymerization can be effected at atmospheric pressures or even lower pressures; however, in some instances it may be desirable to use superatmospheric pressures in order to increase the monomer concentration in contact with the catalyst. Depending upon the temperature employed, pressure, catalyst concentration, etc., the reaction time will vary widely from several hours to a number of days.

The quantity of initiator needed to induce polymerization is not critical. However, since a certain amount of impurities can be expected to be present, it is desirable to employ more than what may be considered to be only trace amounts of the initiator.

By varying conditions such as catalyst concentration, temperature, etc., polymers can be prepared with molecular weights ranging from 20,000 to 280,000.

In order to illustrate the invention with greater particularity, the following specific examples are given, it being understood that they are intended to be only illustrative and not limitative.

*Example I*

This example illustrates the preparation and use of a catalyst with the aluminum trialkyl and the acetylacetone components being present in the molar ratio of 1:1.

The catalyst was prepared in an oxygen free atmosphere and under anhydrous conditions by mixing 10 cc. of a 25 percent n-heptane solution of aluminum triethyl (1.63 millimoles per cc. of solution based on Al) with 1.7 cc. of acetylacetone with the temperature being held at about 0° C.

Polymerization of acrylonitrile was then carried out under a nitrogen blanket by mixing 10 cc. (8.0 gm.) of distilled acrylonitrile with 50 cc. of a dimethyl formamide solvent which had been dried prior to use by passing through a column packed with molecular sieves. To this solution there was then added at room temperature 1 cc. of the catalyst slurry prepared above. The reaction was allowed to proceed for 18 hours at 75° C. after which the polymer was recovered by precipitation in methanol. The polymer was then washed with dilute hydrochloric acid, water and methanol and thereafter dried under vacuum. The calculated conversion was 32.9 percent with the polymer having a molecular weight of about 22,000. The polymer color was substantially white.

*Example II*

This example illustrates the preparation and use of a catalyst with the aluminum trialkyl and the acetylacetone components being present in the molar ratio of 1:2 and wherein the catalyst was washed with the hydrocarbon solvent in which it was prepared prior to use.

The catalyst was prepared by mixing 10 cc. of a 25 percent n-heptane solution of aluminum triethyl (1.6 millimoles per cc. of solution based on Al) with 3.4 cc. of acetylacetone, the reaction being carried out under the same conditions as described for the catalyst preparation of Example I. After completion of the reaction, the product obtained was washed three times with pure n-heptane.

Polymerization of acrylonitrile was then carried out under a nitrogen blanket by mixing 10 cc. (8.0 gm.) of distilled acrylonitrile with 30 cc. of a dried dimethyl formamide solvent. To this solution there was then added at room temperature 2 millimoles of the catalyst prepared above. The reaction mixture was completely colorless at the beginning of the reaction in contrast to the pink color observed at this point in Example I above where an unwashed catalyst was used. The reaction was allowed to proceed at room temperature for approximately 12 hours during which time the polymer precipitated out of solution as it was formed. The calculated conversion at the end of one week was 52.8 percent with the polymer having a molecular weight of about 277,000. The polymer was very white and appeared to be completely free of discoloration.

*Example III*

This example illustrates the preparation and use of a catalyst wherein the aluminum trialkyl and the acetylacetone components were present in the molar ratio of 1:3. As in Example II the catalyst was washed three times with pure n-heptane prior to use.

The catalyst was prepared by mixing 10 cc. of a 25 percent n-heptane solution of aluminum triethyl (1.6 millimoles per cc. of solution based on Al) with 5.1 cc. of acetylacetone, the reaction being carried out under the same condition as described for the catalyst preparation of Example I above. After completion of the reaction, the product obtained was washed three times with pure n-heptane.

Polymerization of acrylonitrile was then carried out under a nitrogen blanket by mixing 10 cc. (8.0 gm.) of distilled acrylonitrile with 30 cc. of a previously dried dimethyl formamide solvent. To this solution there was then added at room temperature 2 millimoles of the catalyst prepared above. The reaction mixture was completely colorless at the beginning of the reaction and remained so throughout. The reaction was allowed to proceed for approximately 12 hours at a temperature of 75° C. during which time the polymer precipitated out of solution as it was formed. The calculated conversion was 38.6 percent with the polymer having a molecular weight of about 68,000. The polymer was pure white being completely free of discoloration.

*Example IV*

This example was prepared in order to compare results with respect to polymer color formation between the polymerization initiators of this invention, as exemplified in the three previous examples, and an initiator of the general type previously noted as having been described in German Patent 1,068,895, that is, an initiator containing two metals.

To 1 cc. of the catalyst composition as prepared in Example III there was added 1 cc. of a 10 percent solution of zinc dibutyl in anhydrous toluene.

Polymerization of acrylonitrile was then carried out under a nitrogen blanket by mixing 10 cc. (8.0 gm.) of distilled acrylonitrile with 50 cc. of a dried dimethyl formamide solvent. To this solution there was then added at room temperature the catalyst moiety just noted above. The reaction was allowed to proceed for about 20 hours at 75° C. after which the polymer was precipitated from solution by introducing 200 cc. of methanol. During the reaction an intense red color developed in the reaction mixture. This color later developed into a dark brown which persisted in the polymer recovered.

It is not intended that the invention be limited by the above specific examples which were presented for illustration only, but only by the appended claims in which it is intended to claim all novelty inherent in the invention, as well as all modifications coming within the spirit and scope of the invention.

I claim:

1. A process for preparing complex catalysts suitable for inducing the polymerization of acrylonitrile which comprises reacting in an inert hydrocarbon solvent, at a reduced temperature, under anhydrous conditions and in an inert atmosphere an aluminum trialkyl wherein the alkyl radical contains from 2 to 12 carbon atoms and acetylacetone in a molar ratio of from 1:2 to 1:3, respectively, and thereafter successively washing the resulting reaction product with said inert hydrocarbon.

2. A process for preparing complex catalysts suitable for inducing the polymerization of acrylonitrile which comprises reacting in a medium of n-heptane, at a temperature of about 0° C., under anhydrous conditions and in an inert atmosphere aluminum triethyl and acetylacetone in a molar ratio of from 1:2 to 1:3, respectively, and thereafter successively washing the resulting reaction product with n-heptane.

3. The product obtained in accordance with the process of claim 1.

4. The product obtained in accordance with the process of claim 2.

References Cited by the Examiner

UNITED STATES PATENTS

| | | | |
|---|---|---|---|
| 2,791,574 | 5/57 | Lanham | 260—89.5 |
| 2,924,579 | 2/60 | Young | 252—431 |
| 2,936,291 | 5/60 | Peters et al. | 252—431 |
| 2,961,433 | 11/60 | Linn | 260—88.7 |

OTHER REFERENCES

Roha et al.: "Jour. Polymer Science," volume 38 (1959), pages 51–61.

TOBIAS E. LEVOW, *Primary Examiner.*

PHILIP E. MANGAN, SAMUEL H. BLECH,
*Examiners.*